US006772907B2

(12) United States Patent
Kim

(10) Patent No.: US 6,772,907 B2
(45) Date of Patent: Aug. 10, 2004

(54) AUTOMATIC TABLET DISPENSING AND PACKAGING SYSTEM

(76) Inventor: Jun Ho Kim, 100-23, Galsandong, Daisuhgu, Taegu (KR)

(*) Notice: Subject to any disclaimer, the term of this patent is extended or adjusted under 35 U.S.C. 154(b) by 27 days.

(21) Appl. No.: 10/370,009

(22) Filed: Feb. 20, 2003

(65) Prior Publication Data

US 2003/0156925 A1 Aug. 21, 2003

(30) Foreign Application Priority Data

Feb. 20, 2002 (KR) ................................ 20-2002-0005029

(51) Int. Cl.[7] ................................................ B65G 59/00
(52) U.S. Cl. .......................................... 221/131; 53/154
(58) Field of Search ................................ 221/152, 236, 221/131, 197, 3, 6, 9, 15; 53/154, 131.5, 168, 568, 307, 155, 238, 493

(56) References Cited

U.S. PATENT DOCUMENTS

| | | | | |
|---|---|---|---|---|
| 5,097,652 A * | 3/1992 | Inamura et al. | ............... | 53/493 |
| 6,170,230 B1 * | 1/2001 | Chudy et al. | ................. | 53/168 |
| 6,216,418 B1 | 4/2001 | Kim | ............................ | 53/131 |
| 6,367,232 B2 | 4/2002 | Kim | ............................ | 53/507 |
| 6,449,921 B1 | 9/2002 | Kim | ............................ | 53/154 |

FOREIGN PATENT DOCUMENTS

KR 20-2002-0005029 2/2002

* cited by examiner

*Primary Examiner*—Kenneth Noland
(74) *Attorney, Agent, or Firm*—Park & Sutton LLP; John K. Park

(57) ABSTRACT

An automatic tablet dispensing and packaging system comprises a tablet dropping unit and a tablet packaging unit. The tablet dropping unit has door cabinets serving as a front double door of the system and slider cabinets horizontally aligned in rear of the door cabinets. The slider cabinets are linearly slidable to move back and forth so that the forward sliding (toward the door cabinet) of the slider cabinets can be effected when the door cabinets are swung open. Tablet cassettes having tablets are detachably racked in each cabinet in columns and rows. Hoppers to guide down the tablets into the tablet packaging unit are provided such that angles formed by a vertical line and respective inner side surfaces of the hoppers are gradually decremented to efficiently decrease tablet impact on the inner side surfaces of the hoppers.

15 Claims, 5 Drawing Sheets

AUTOMATIC TABLET DISPENSING AND PACKAGING SYSTEM

CLAIMING FOREIGN PRIORITY

The applicant claims and requests a foreign priority, through the Paris Convention for the Protection of Industry Property, based on a patent application filed in the Republic of Korea (South Korea) with the filing date of Feb. 20, 2002, with the patent application number 20-2002-0005029, by the applicant. (See the attached Declaration)

BACKGROUND OF THE INVENTION

The invention relates to a pharmaceutical automation system. More particularly, the present invention relates to an automatic tablet dispensing and packaging system having a plurality of hoppers to efficiently guide tablets to a tablet packaging unit.

An automatic tablet dispensing and packaging system is generally provided with a tablet packaging portion and a tablet dropping portion placed above the packaging portion. The tablet dropping portion includes a plurality of tablet cassettes containing different sets of tablets. In order to facilitate tablet cassette installation and replacement, Japanese Utility Model Publication No. 57-105201 discloses sliding cabinets with tablet cassettes vertically stacked. However, the Japanese disclosure has a drawback where it takes too much time to check tablet amount in each cassette and refill the cassettes.

SUMMARY OF THE INVENTION

The present invention is contrived to overcome the conventional disadvantages. Accordingly, it is an object of the present invention to provide an automatic tablet dispensing and packaging system having slider cabinets together with a plurality of hoppers to substantially save labor required for tablet cassette refill. Another object of the present invention is to substantially increase capacity of housing tablet cassettes in the system while facilitating management efficiency of the system. A further object is to decrease tablet impact on an inner surface of each hopper during tablet descent from tablet cassettes, by optimally differentiating horizontal levels of the hoppers.

To achieve these and other objects, the tablet supplying and packaging system according to the present invention comprises a tablet dropping unit having door cabinets and slider cabinets. The door cabinets are linearly aligned and swiveled to each side portion of the tablet dropping unit to serve as a front double door of the table dropping unit. The slider cabinets are horizontally aligned in rear of the door cabinets such that each longer side surface of the slider cabinets becomes perpendicular to each rear surface of the door cabinet. The slider cabinets are linearly slidable to move back and forth so that the forward sliding (toward the door cabinet) of the slider cabinets can be effected when the door cabinets are swung open, whereby the slider cabinets are selectively pulled out through a space reserved by opening the door cabinets.

In a preferred version, a plurality of tablet cassettes each containing therein and dropping therefrom a predetermined type of tablets are detachably racked in said each cabinet in columns and rows. A slider cabinet hopper below the slider cabinets to guide down the tablets from the cassettes in the slider cabinets. A door cabinet hopper below the door cabinets to guide down the tablets from the cassettes in the slider cabinets, and the slider cabinet hopper is horizontally aligned with the door cabinet hopper.

A middle hopper to guide down the tablets from the slide and door cabinets hoppers. A tray unit below the door cabinet hopper and adjacent to the middle hopper, wherein the tray unit has a tray partitioned to releasably hold therein extra types of tablets, wherein the extra types of tablets are selectively released in accordance with a conveyer belt mechanism. The tray is horizontally pulled out from the system to open for spreading therein the extra types of tablets.

For a better performance, a lower hopper below the tray unit and the middle hopper to guide down the tablets from the tray unit and the middle hopper, and a main hopper below the lower hopper to guide down the tablets from the lower hopper. A packaging unit adjacent to the main hopper to package the tablets from the main hopper into tablet containing paper bags.

The advantages of the present invention are numerous in that: (1) the automatic tablet dispensing and packaging system allows the cabinets differentiated in angles to be formed so as to optimally diversify horizontal levels thereof, thereby substantially decreasing tablet impact on an inner surface of each hopper during tablet descent from tablet cassettes; (2) the system enable a system operator or a pharmacist to substantially save labor required for tablet cassette refill by placing frequently demanded tablet cassettes in front door cabinets and less frequently demanded tablets cassettes in rear of the front door cabinets working in a sliding mechanism; and (3) the system substantially increases capacity of housing tablet cassettes in the system while facilitating management efficiency of the system.

Although the present invention is briefly summarized, the full understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
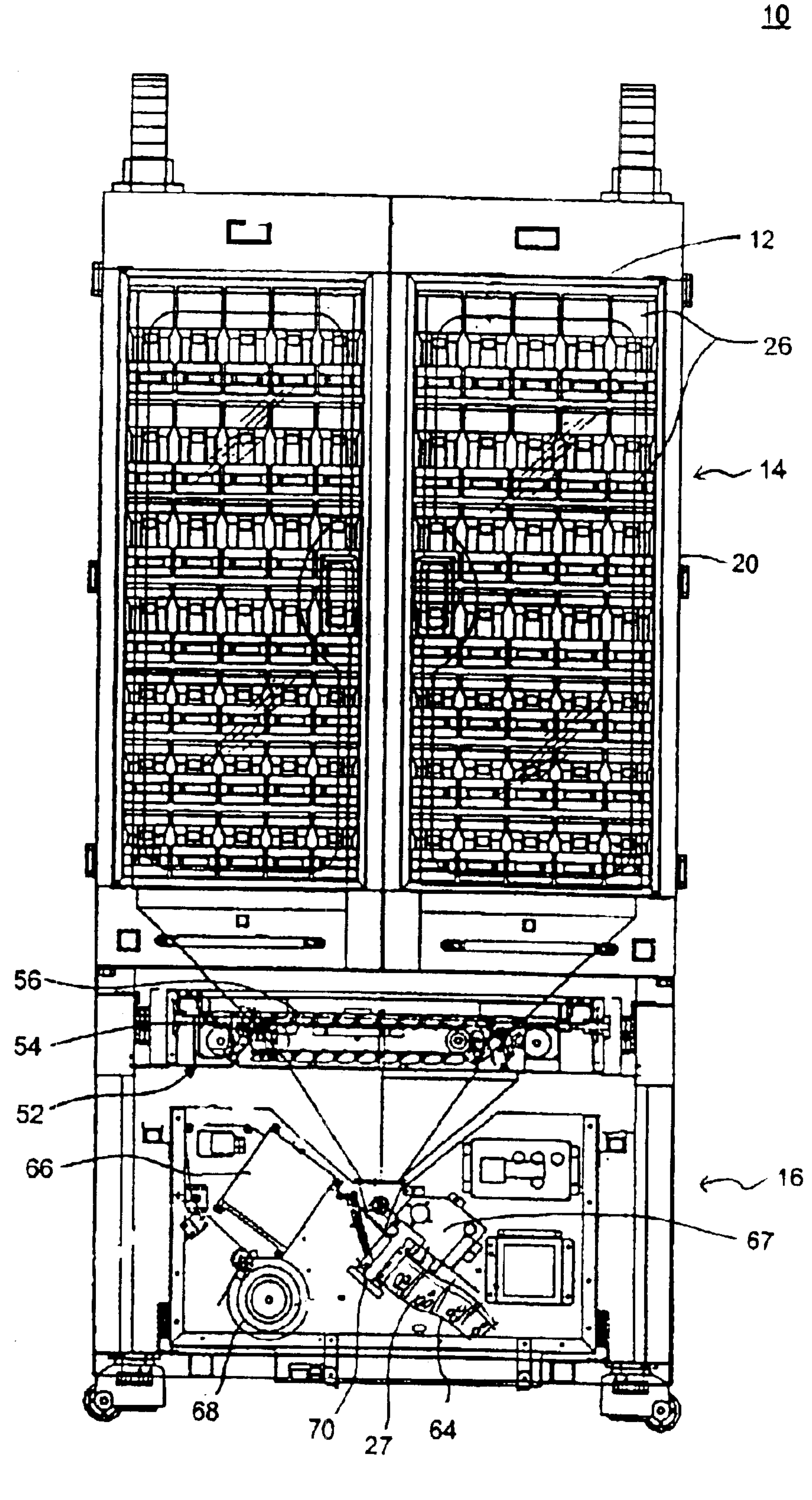
FIG. 1 is a front view of an automatic tablet dispensing and packaging system according to the present invention.
Figure 2:
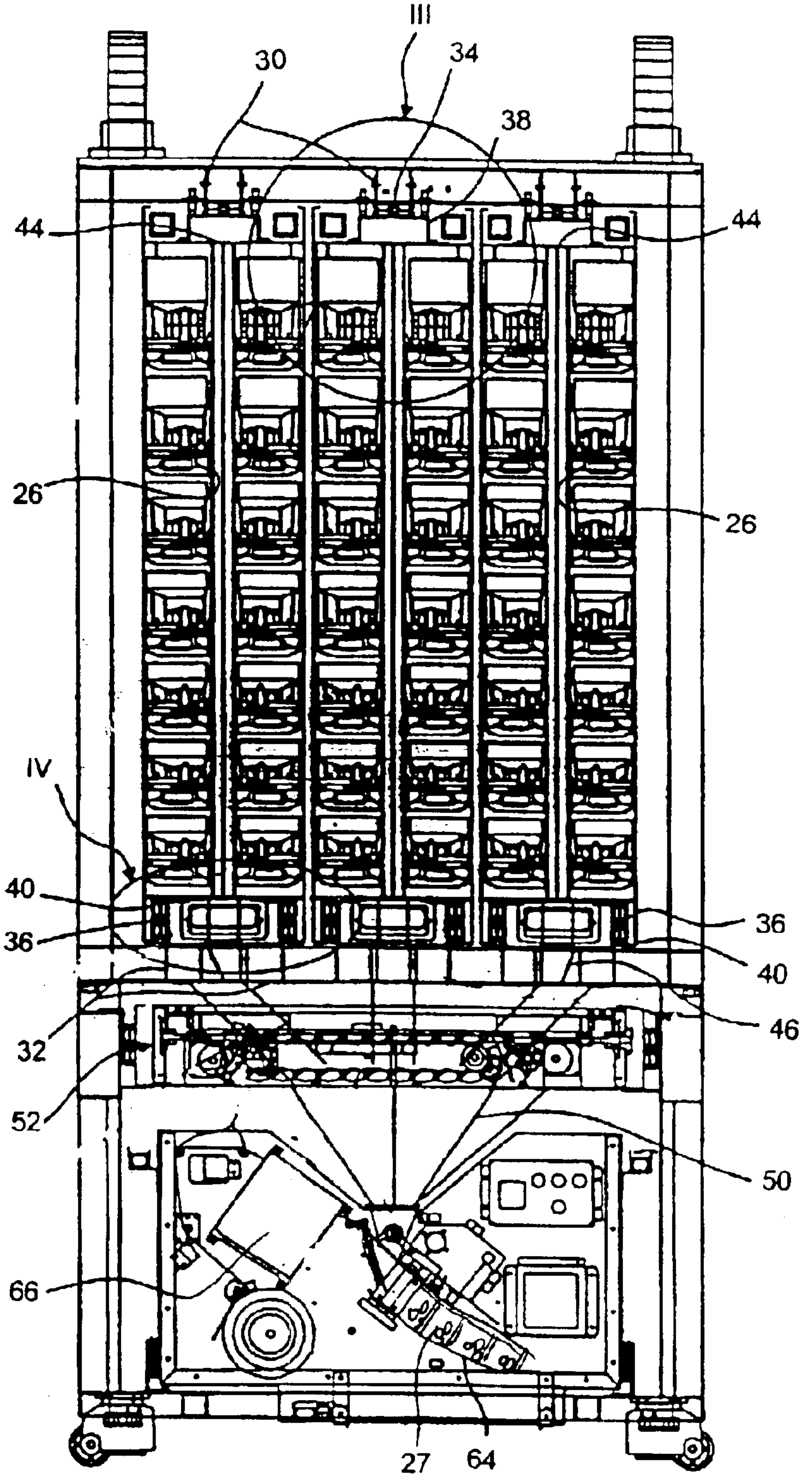
FIG. 2 is a front view of the system in FIG. 1 without a front cabinet.

FIG. 1 shows a front view of an automatic tablet dispensing and packaging system 10 according to the present invention and FIG. 2 shows a front view of the system 10 without door cabinets 12. As shown therein, the automatic tablet dispensing and packaging system 10 comprises a tablet dropping unit 14 and a packaging unit 16 provided substantially below the tablet dropping unit 14. The tablet dropping unit 14 includes the door cabinets 12 and slider cabinets 18.

As further shown in FIGS. 3–7, the door cabinets 12 are linearly aligned and swiveled to each side portion 20 of the tablet dropping unit 14 to serve as a front double door of the table dropping unit 14. To substantially increase tablet capacity, the door cabinets 12 may be rotatably engaged to each other in a stacking formation by their selected side ends so that the engagement of the door cabinets 12 can be implemented by hinges or swivels.

The slider cabinets 18 are horizontally aligned in rear of the door cabinets 12 such that each longer side surface 22 of the slider cabinets 18 becomes perpendicular to each rear surface 24 of the door cabinets 12. The slider cabinets 18 are linearly slidable to move back and forth so that the forward sliding, toward the door cabinets 12, of the slider cabinets 18 can be effected when the door cabinets 12 are swung open, whereby the slider cabinets 18 are selectively pulled out through a space reserved by opening the door cabinets 12.

In this construction, a plurality of tablet cassettes 26 each containing therein and dropping therefrom a predetermined type of tablets 27 are detachably racked in each cabinet 12, 18 in columns and rows. Specifically, a plurality of cartridges 28 provided in each cabinet 12, 18 in columns and rows receive thereon the tablet cassettes 26. That is, the tablet cassettes 26 are detachably mounted on the corresponding cartridges 28. Each cartridge 28 serves to controllably release tablets 27 stored in the cassette 26 in accordance with command from a controller (not shown).

Figure 3:
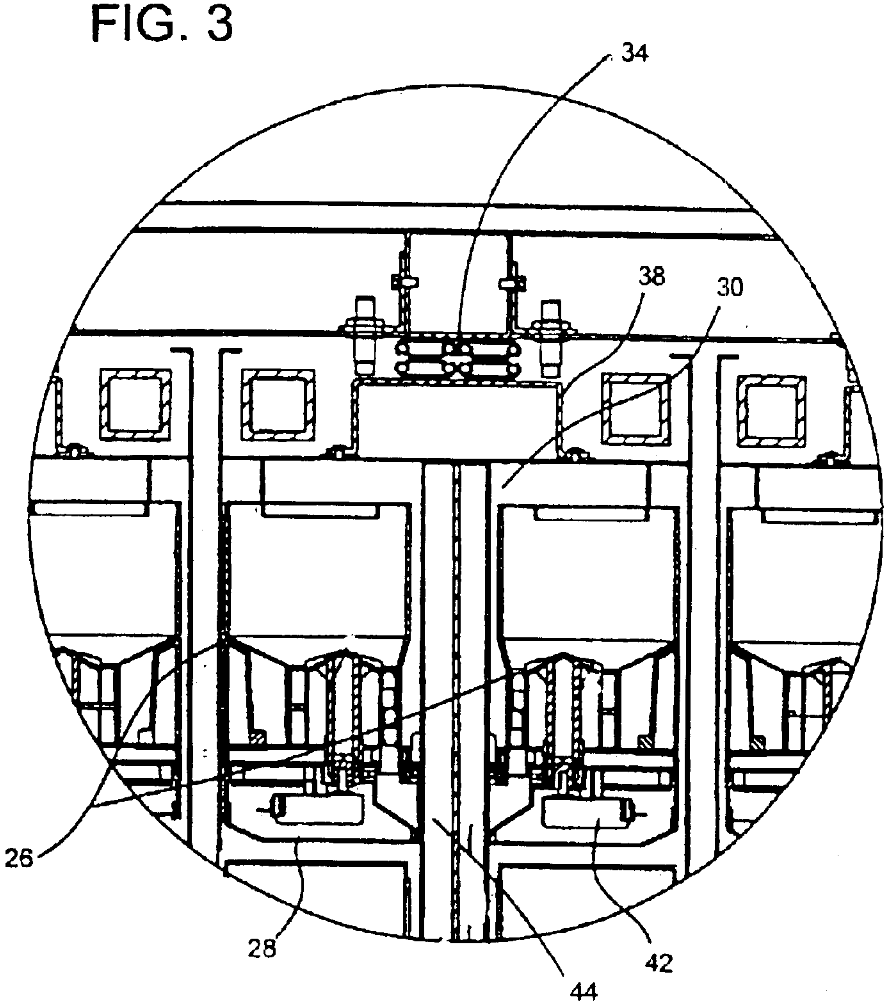
FIG. 3 is an enlargement view of portion III in FIG. 2.
Figure 4:
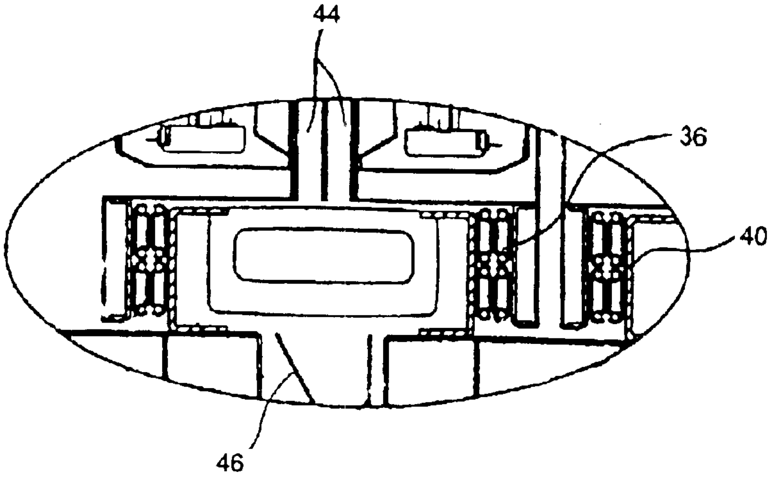
FIG. 4 is an enlargement view of portion IV in FIG. 2.
Figure 5:
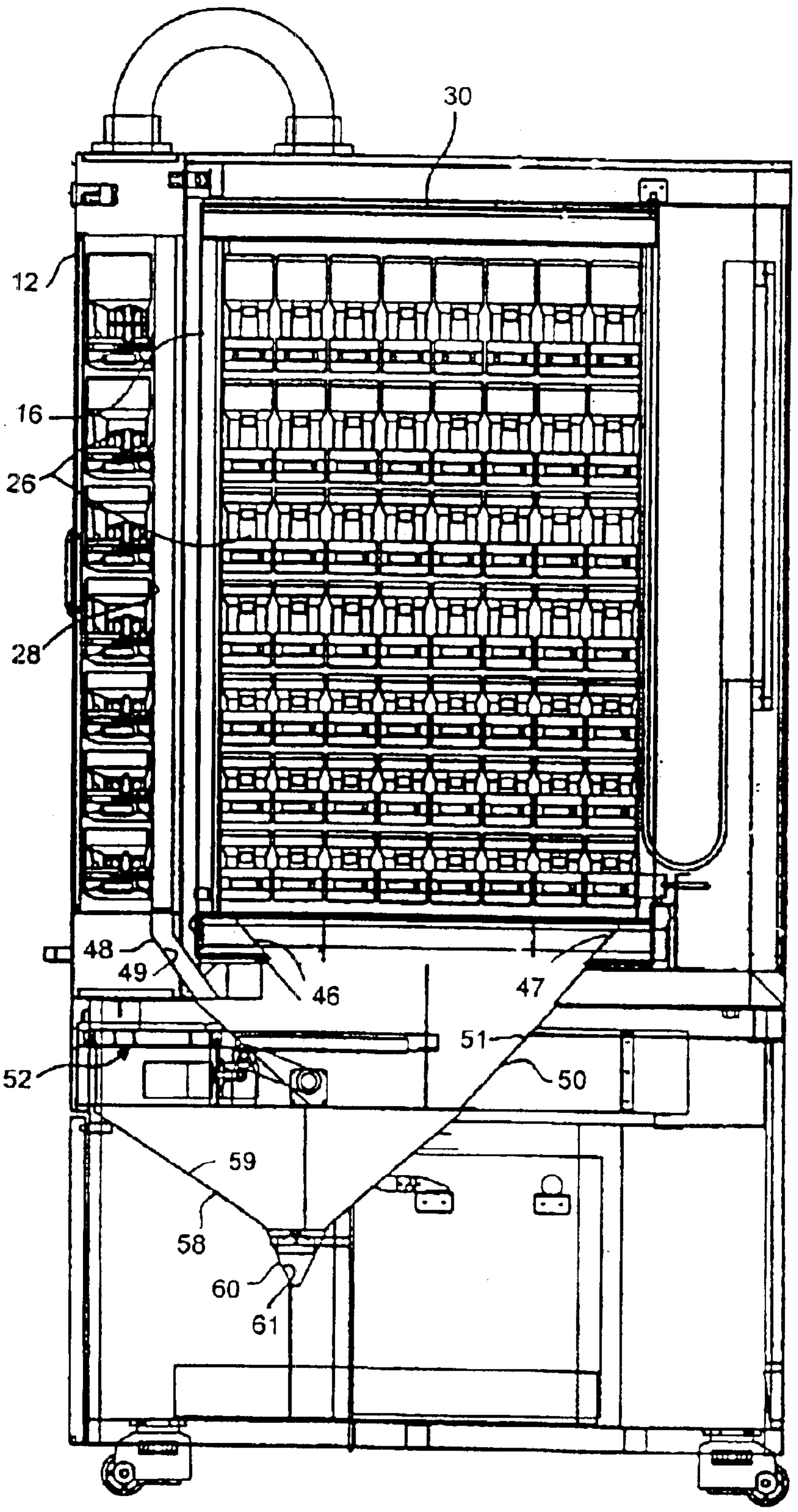
FIG. 5 is a side view of the system in FIG. 1.
Figure 6:
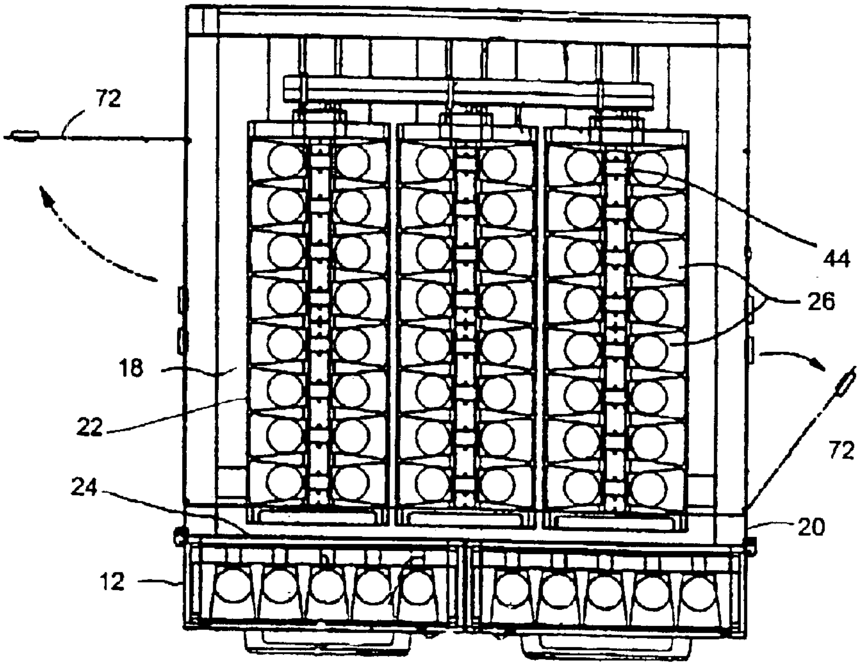
FIGS. 6 and 7 are plan views of the system in FIG. 1 to illustrate functions of the system.
Figure 7:
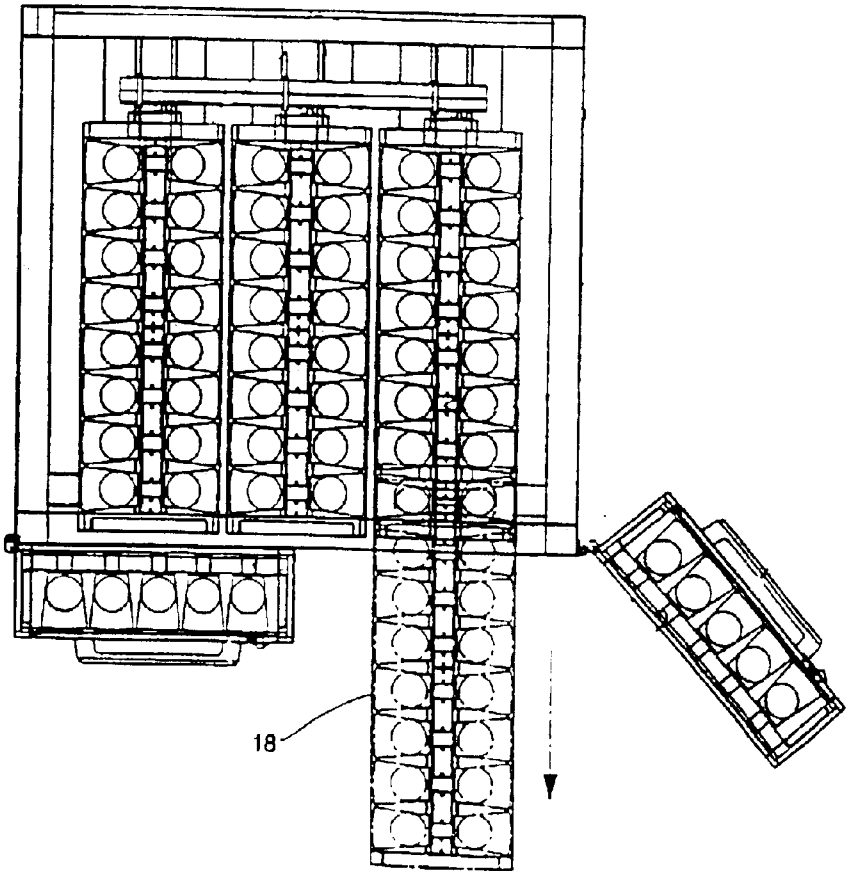

FIG. 3 shows a connection mechanism of the slider cabinets 18 and an upper frame 30 and FIG. 4 shows another connection mechanism of the slider cabinet and a lower frame 32. The upper and lower frames 30, 32 are engaged to the tablet dropping unit 14 for mutual support. An upper slide pack 34 is provided to slidably engage an upper end of each slider cabinet 18 to the upper frame 30, and a lower slider pack 36 is provided to slidably engage an lower end of each slide cabinet 18. Each slide pack 34, 36 are attached to the corresponding frames 32, 34 via brackets 38, 40. Likewise, the slidable connection between each slider cabinet 18 and the frames 32, 34 enables each slider cabinet 18 to slide out for tablet refill and to slide back in after the tablet refill for an automatic tablet dispensing operation according to control of the controller (not shown). Needless to say the door cabinets 12 should stay open for the outward sliding of each slider cabinet 18.

Respective types of tablets 27 stored in each cassette 26 are selectively dropped down in accordance with the command of the controller (not shown) that processes each prescription input for patients. Specifically, a motor 42 in each cartridge 28 controlled by the controller allows the cassette 26 to selectively release the tablets 27. The tablets 27 released from each cassette 26 are lowered through tablet passages 44.

A slider cabinet hopper 46 is provided below the slider cabinets 18 to guide down the tablets 27 from the cassettes 26 in the slider cabinets 18. Also, a door cabinet hopper 48 is provided below the door cabinets 12 to guide down the tablets 27 from the cassettes 26 in the door cabinets 12. The slider cabinet hopper 46 is horizontally aligned even with the door cabinet hopper 48. Meanwhile, a middle hopper 50 is provided below the cabinet hoppers 46, 48 to guide down the tablets 27 from the slider and door cabinets hoppers 46, 48.

In a preferred mode, a tray unit 52 is provided substantially below the door cabinet hopper 48 and adjacent to the middle hopper 50. The tray unit 52 has a tray 54 partitioned to releasably hold therein extra types of tablets. The extra types of tablets are selectively released in accordance with a conveyer belt mechanism. The tray 54 is horizontally pulled out from the system 10 to open for spreading therein the extra types of tablets, and pushed in for the tablet releasing operation together with the tablet cassettes 26. Here, when viewed from a front side of the system 10, it is preferred that the tray unit 52 is placed between the tablet dropping unit 14 and the tablet packaging unit 16.

A lower hopper 58 is provided below the tray unit 52 and the middle hopper 50 to guide down the tablets 27 from the tray unit 52 and the middle hopper 50. In order to efficiently collect and accurately drop the tablets gathered till the lower hopper 58, there is provided a main hopper 60 below the lower hopper 58 to guide down the tablets 27 from the lower hopper 58. In this hopper mechanism, angles formed by a vertical imaginary line and respective inner side surfaces 47, 49, 51, 59, 61 of the hoppers 46, 48, 50, 58, 60 are gradually decremented to efficiently decrease tablet impact on the inner side surfaces of the hoppers 46, 48, 50, 58, 60.

The packaging unit 16 provided adjacent to the main hopper 60 performs packaging of the tablets 27 from the main hopper 60 into tablet containing paper bags 64. The tablet packaging unit 16 comprises a printer 66 to print respective information on a packaging paper 68, and a heating assembly 67 to package the tablets 27 released through the main hopper 60 into the tablet containing paper bags 64 using the packaging paper 68. The heating assembly 67 includes heating rollers 70 to consecutively seal the packaging paper 68 to the tablet containing paper bags 64.

Additionally, the slider cabinet partitioning is formed in at least three pairs to enable a pair-by-pair sliding, so each pair of the slider cabinets 14 is a double layer set of the tablet cassettes 26. The passages 44 are in an upright formation to communicate with the tablet cassettes 26 in said each cabinet 12, 18. The upright tablet passages 44 are aligned with the tablet cassette columns to facilitate the tablet guidance from the tablet cassettes 26 of the cabinets 12, 18 into the hoppers 46, 48, 50, 58, 60. Also, it is recommended that side doors 72 be formed parallel to each slider cabinet 18 to linearly aligned with the side portion 20 of the tablet dropping unit 14 so that cassette status in the slider cabinets 18 can be easily checked up without opening the door cabinets 12.

As discussed above, an advantage of the automatic tablet dispensing and packaging system 10 is that the hoppers differentiated in angles are formed to optimally diversify horizontal levels thereof, thereby substantially decreasing tablet impact on an inner surface of each hopper during tablet descent from tablet cassettes. Further, the system 10 enable a system operator or a pharmacist to substantially save labor required for tablet cassette refill by placing frequently demanded tablet cassettes in front door cabinets 12 and less frequently demanded tablets cassettes in rear of the front door cabinets 12 to work in a sliding mechanism. In addition, the system 10 substantially increases capacity of housing tablet cassettes in the system while facilitating management efficiency in a limited system installation space.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. An automatic tablet dispensing and packaging system, comprising:

a) a tablet dropping unit having door cabinets and slider cabinets, wherein the door cabinets are linearly aligned and swiveled to each side portion of the tablet dropping unit to serve as a front double door of the table dropping unit, wherein the slider cabinets are horizontally aligned in rear of the door cabinets such that each longer side surface of the slider cabinets becomes perpendicular to each rear surface of the door cabinets, wherein the slider cabinets are linearly slidable to move back and forth so that the forward sliding (toward the door cabinet) of the slider cabinets can be effected when the door cabinets are swung open, whereby the slider cabinets are selectively pulled out through a space reserved by opening the door cabinets;

b) a plurality of tablet cassettes each containing therein and dropping therefrom a predetermined type of tablets, wherein the tablet cassettes are detachably racked in said each cabinet in columns and rows;

c) a slider cabinet hopper below the slider cabinets to guide down the tablets from the cassettes in the slider cabinets;

d) a door cabinet hopper below the door cabinets to guide down the tablets from the cassettes in the slider cabinets, wherein the slider cabinet hopper is horizontally aligned even with the door cabinet hopper;

e) a middle hopper to guide down the tablets from the slide and door cabinets hoppers;

f) a main hopper below the middle hopper to guide down the tablets from the middle hopper, wherein angles formed by a vertical imaginary line and respective inner side surfaces of the hoppers are gradually decremented to efficiently decrease tablet impact on the inner side surfaces of the hoppers; and g) a packaging unit adjacent to the main hopper to package the tablets from the main hopper into tablet containing paper bags.

2. The system of claim 1 wherein the tablet cassettes are detachably mounted on corresponding cartridges, wherein the cartridges control tablet release of the tablet cassettes.

3. The system of claim 1 wherein the slider cabinets are partitioned in at least three pairs to enable a pair-by-pair sliding.

4. The system of claim 3 wherein said each pair of the slider cabinets is a double layer set of the tablet cassettes.

5. The system of claim 1 wherein the tablet packaging unit comprises:

a) a printer to print respective information on a packaging paper; and b) a heating assembly to package the tablets released through the main hopper into the tablet containing paper bags using the packaging paper.

6. The system of claim 5 wherein the heating assembly includes heating rollers to consecutively seal the packaging paper to the tablet containing paper bags.

7. The system of claim 1 further comprising a plurality of upright tablet passages formed in said each cabinet to communicate with the tablet cassettes in said each cabinet, wherein the upright tablet passages are aligned with the tablet cassette columns to facilitate the tablet guidance from the tablet cassettes of the cabinets into the hoppers.

8. An automatic tablet dispensing and packaging system, comprising:

a) a tablet dropping unit having door cabinets and slider cabinets, wherein the door cabinets are linearly aligned and swiveled to each side portion of the tablet dropping unit to serve as a front double door of the table dropping unit, wherein the slider cabinets are horizontally aligned in rear of the door cabinets such that each longer side surface of the slider cabinets becomes perpendicular to each rear surface of the door cabinets, wherein the slider cabinets are linearly slidable to move back and forth so that the forward sliding (toward the door cabinet) of the slider cabinets can be effected when the door cabinets are swung open, whereby the slider cabinets are selectively pulled out through a space reserved by opening the door cabinets;

b) a plurality of tablet cassettes each containing therein and dropping therefrom a predetermined type of tablets, wherein the tablet cassettes are detachably racked in said each cabinet in columns and rows;

c) a slider cabinet hopper below the slider cabinets to guide down the tablets from the cassettes in the slider cabinets;

d) a door cabinet hopper below the door cabinets to guide down the tablets from the cassettes in the slider cabinets, wherein the slider cabinet hopper is horizontally aligned with the door cabinet hopper;

e) a middle hopper to guide down the tablets from the slide and door cabinets hoppers;

f) a tray unit below the door cabinet hopper and adjacent to the middle hopper, wherein the tray unit has a tray partitioned to releasably hold therein extra types of tablets, wherein the extra types of tablets are selectively released in accordance with a conveyer belt mechanism, wherein the tray is horizontally pulled out from the system to open for spreading therein the extra types of tablets;

g) a lower hopper below the tray unit and the middle hopper to guide down the tablets from the tray unit and the middle hopper;

h) a main hopper below the lower hopper to guide down the tablets from the lower hopper; and i) a packaging unit adjacent to the main hopper to package the tablets from the main hopper into tablet containing paper bags.

9. The system of claim 8 wherein the tablet cassettes are detachably mounted on corresponding cartridges, wherein the cartridges control tablet release of the tablet cassettes.

10. The system of claim 8 wherein angles formed by a vertical imaginary line and respective inner side surfaces of the hoppers are gradually decremented to efficiently decrease tablet impact on the inner side surfaces of the hoppers.

11. The system of claim 8 wherein the slider cabinets are partitioned in at least three pairs to enable a pair-by-pair sliding.

12. The system of claim 11 wherein said each pair of the slider cabinets is a double layer set of the tablet cassettes.

13. The system of claim 8 wherein the tablet packaging unit comprises:

a) a printer to print respective information on a packaging paper; and b) a heating assembly to package the tablets released through the main hopper into the tablet containing paper bags using the packaging paper.

14. The system of claim 13 wherein the heating assembly includes heating rollers to consecutively seal the packaging paper to the tablet containing paper bags.

15. The system of claim 8 further comprising a plurality of upright tablet passages formed in said each cabinet to communicate with the tablet cassettes in said each cabinet, wherein the upright tablet passages are aligned with the tablet cassette columns to facilitate the tablet guidance from the tablet cassettes of the cabinets into the hoppers.

* * * * *